US005980788A

United States Patent [19]

Katsumata et al.

[11] Patent Number: 5,980,788

[45] Date of Patent: Nov. 9, 1999

[54] LATERAL HIGH-RESISTANCE ADDITIVE FOR ZINC OXIDE VARISTOR, ZINC OXIDE VARISTOR PRODUCED USING THE SAME, AND PROCESS FOR PRODUCING THE VARISTOR

[75] Inventors: Masaaki Katsumata, Hirakata; Osamu Kanaya, Chitose, both of Japan

[73] Assignee: Matsushita Electric Industrial Co., Ltd., Osaka, Japan

[21] Appl. No.: 08/945,753

[22] PCT Filed: Apr. 30, 1996

[86] PCT No.: PCT/JP96/01182

§ 371 Date: Feb. 20, 1998

§ 102(e) Date: Feb. 20, 1998

[87] PCT Pub. No.: WO96/36058

PCT Pub. Date: Nov. 14, 1996

[30] Foreign Application Priority Data

May 8, 1995 [JP] Japan .................................. 7-109256

[51] Int. Cl.[6] ............................ H01B 1/08; C04B 35/14; B28B 1/00

[52] U.S. Cl. .................... 252/519.54; 501/126; 264/621; 264/671

[58] Field of Search ......................... 252/519.54; 501/94, 501/126; 264/617, 621, 671

[56] References Cited

U.S. PATENT DOCUMENTS

| | | | |
|---|---|---|---|
| 4,111,852 | 9/1978 | Ho et al. | 252/518 |
| 4,500,642 | 2/1985 | Reiji et al. | 501/54 |
| 4,933,659 | 6/1990 | Imai et al. | 338/20 |
| 5,770,113 | 6/1998 | Iga et al. | 252/519.51 |

FOREIGN PATENT DOCUMENTS

| | | |
|---|---|---|
| 60-206002 | 10/1985 | Japan . |
| 61-95501 | 5/1986 | Japan . |
| 61-259502 | 11/1986 | Japan . |
| 63-114104 | 5/1988 | Japan . |

*Primary Examiner*—Mark Kopec
*Attorney, Agent, or Firm*—McDermott, Will & Emery

[57] ABSTRACT

The invention aims at providing highly reliable zinc oxide varistors through simple production steps. The varistor is produced by dispersing a powdery raw material comprising 1–40 molar % (in terms of $Fe_2O_3$) iron, 0–20 molar % (in terms of $Bi_2O_3$) bismuth, and the balance consisting of $SiO_2$ in a solution of a water-soluble binder such as polyvinyl alcohol, and applying the formed dispersion to a molded or calcined zinc oxide varistor to form on the lateral face thereof a lateral high-resistance layer (2) containing $Zn_2SiO_4$ as the principal ingredient and a solid solution of iron in $Zn_7Sb_2O_{12}$ as the auxiliary ingredient.

15 Claims, 2 Drawing Sheets

LATERAL HIGH-RESISTANCE ADDITIVE FOR ZINC OXIDE VARISTOR, ZINC OXIDE VARISTOR PRODUCED USING THE SAME, AND PROCESS FOR PRODUCING THE VARISTOR

TECHNICAL FIELD

The present invention relates to a lateral high-resistance additive for forming a lateral high-resistance layer of a zinc oxide varistor mainly used in the field of electric power, a zinc oxide varistor using the same, and a process for producing the zinc oxide varistor.

BACKGROUND ART

A conventional process for producing a zinc oxide varistor is disclosed, for example, in Japanese Laid-open Patent No. 61-259502, and its procedure is as follows.

First, ZnO is a principal ingredient, and small amounts of metal oxides such as $Bi_2O_3$, $Co_2O_3$, MnO, $Cr_2O_3$, $Sb_2O_3$, NiO, and $Al_2O_3$ are added as auxiliary ingredients. Mixing them sufficiently together with water, binder, and dispersant, slurry is prepared, which is dried and granulated by a spray dryer, and the obtained power is formed in a disk of 55 mm in diameter and 30 mm in thickness. After baking at 500° C. in order to remove organic matter, it is calcined at 1020° C., and a calcined material is obtained. A prepared slurry for forming a high-resistance layer is applied on this calcined material by means of a spray gun.

This slurry for forming a high-resistance layer is prepared by reacting $Fe_2O_3$, ZnO and $Sb_2O_3$ to produce $ZnFe_2O_4$ and $Zn_7Sb_2O_{12}$, weighing powder of $ZnFe_2O_4$ and $Zn_7Sb_2O_{12}$ so that the ratio of Fe and Sb may be 2:1, adding purified water so that the ratio by weight to this powder may be 1:1, and adding binder such as polyvinyl alcohol for increasing the strength of the coat film by about 0.1 wt. %.

Consequently, the calcined material on which the slurry for forming a high-resistance layer is applied is baked in air at 1200° C. to obtain sinter, and both ends of the sinter is polished to form an Al sprayed electrode, thereby obtaining a zinc oxide varistor having a lateral high-resistance layer.

In this conventional method, as the slurry for forming a high-resistance layer, $ZnFe_2O_4$ and $Zn_7Sb_2O_{12}$ preliminarily synthesized at high temperature are used, and when a lateral high-resistance layer is formed by using them, the reactivity of the calcined material with $ZnFe_2O_4$ and $Zn_7Sb_2O_{12}$ is not sufficient, and the contact between the sinter and the lateral high-resistance layer is poor, and the lateral high-resistance layer is likely to be peeled off during discharge current withstand test, and hence the discharge current withstand capacity characteristic is low.

DISCLOSURE OF THE INVENTION

It is hence an object of the invention to present a zinc oxide varistor excellent in reliability including discharge current withstand capacity characteristic.

To achieve the object, the invention forms a lateral high-resistance additive for zinc oxide varistor by using a metal oxide comprising 1–40 molar % (in terms of $Fe_2O_3$) iron, 0–20 molar % (in terms of $Bi_2O_3$) bismuth, and the balance consisting of $SiO_2$.

This lateral high-resistance additive is applied and baked on a lateral face of a molded or calcined material containing zinc oxide as principal ingredient and at least antimony as auxiliary ingredient to form a high-resistance layer on the lateral face of the zinc oxide varistor, and therefore the iron, bismuth and silicon in the lateral high-resistance additive react very well with the ingredients in the molded or calcined material to produce a high-resistance layer containing $Zn_2SiO_4$ as principal ingredient and at least $Zn_7Sb_2O_{12}$ dissolving Fe as auxiliary ingredient. This high-resistance layer is homogeneous and excellent in contact with the sinter, and hence discharge current withstand capacity characteristic and other properties can be enhanced substantially.

Moreover, since this lateral high-resistance additive is also extremely excellent in reactivity with the molded material, it can be directly applied on the molded material, and the conventional calcining process of molded material can be omitted, and the loss in time and energy can be saved, so that the productivity may be enhanced.

BEST MODE FOR CARRYING OUT THE INVENTION

Figure 1:
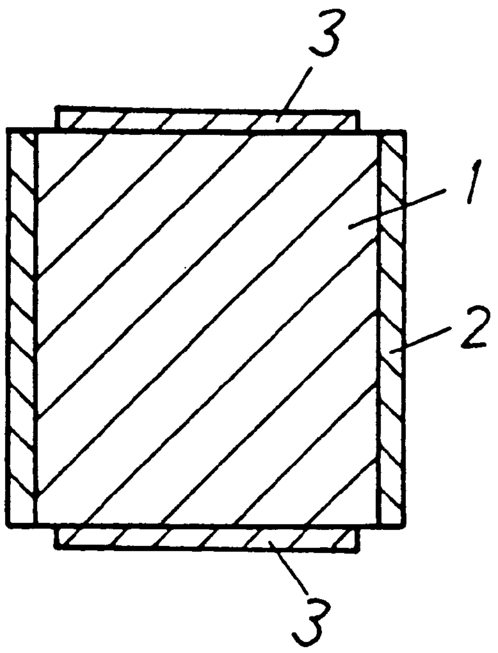
FIG. 1 is a sectional view of a zinc oxide varistor in an embodiment of the invention.

Referring now to the drawings, a zinc oxide varistor and its manufacturing method, and a lateral high-resistance additive of the zinc oxide varistor according to an embodiment of the invention are described below.

(Embodiment 1)

Supposing the total amount of powdery raw material to be 100 molar % for the principal ingredient of ZnO powder, weighing auxiliary ingredients by 0.5 molar % of $Bi_2O_3$, 0.5 molar % of $Co_2O_3$, 0.5 molar % of $MnO_2$, 1.0 molar % of $Sb_2O_3$, 0.5 molar % of $Cr_2O_3$, 0.5 molar % of NiO, 0.5 molar % of $SiO_2$, $5\times10^{-3}$ molar % of $Al_2O_3$, and $2\times10^{-2}$ molar % of $B_2O_3$, further adding purified water, binder and dispersant, they were mixed sufficiently in a ball mill and slurry was obtained. From the viewpoint of dispersion, $B_2O_3$ is preferred to be added in a form of glass such as bismuth borosilicate or lead borosilicate. As the binder, polyvinyl alcohol (PVA) is preferably added by 1 wt. % of the solid matter from the viewpoint of molding performance, or the dispersant should be added by about 0.5 wt. % of the solid matter from the viewpoint of slurry dispersion.

This slurry was dried and granulated by using a spray dryer, and granulated powder was obtained. The granulated powder was compressed and molded at a pressure of 500 $kg/cm^2$ in a size of 40 mm in diameter and 40 mm in thickness by a hydraulic press, and a molded material was obtained.

Next, a lateral high-resistance additive was prepared in the following method. As raw materials of the lateral high-resistance additive, $SiO_2$, $Bi_2O_3$, and $Fe_2O_3$ were weighed as specified, and lateral additives of various compositions were prepared. As an organic binder, 5 wt. % of PVA aqueous solution was used. The solid matter ratio of metal oxide was 30 wt. %, and mixing sufficiently in a ball mill together with the binder, a slurry lateral high-resistance additive was prepared. At this time, to enhance the dispersion of the lateral high-resistance additive slurry, it is preferred to add a surface active agent by 0.1 to 0.5 wt. %.

On the lateral portion of the prepared molded material, the lateral high-resistance additive was applied by spray coating method. At this time, while rotating, the molded material was moved up and down, and the lateral high-resistance additive was sprayed so as to be applied uniformly on the molded material. The coating amount of the lateral high-resistance additive on the molded material was 15 $mg/cm^2$. Herein, the coating amount of the lateral high-resistance additive is preferably 5 to 100 $mg/cm^2$, and more preferably 7.5 to 50 $mg/cm^2$. The reason is, if the coating amount of the lateral high-resistance additive is less than 5 $mg/cm^2$, the thickness of the lateral high-resistance additive of the zinc oxide varistor element is too thin, and high current short duration characteristic is low, or if exceeding 100 $mg/cm^2$, the reactivity between the lateral high-resistance additive and element is worsened, and an unreacted portion is left over to lower also the high current short duration characteristic. To evaluate the performance of the lateral high-resistance additive itself of the invention, the molded material was calcined for 5 hours at 900° C. to prepare a calcined material, and the lateral high-resistance additive was applied in the same process.

The molded material and calcined material coated with lateral high-resistance additive were put in a baking container, and baked for 5 hours at 1100° C. to bake the molded material and calcined material, and sinter was obtained by reaction between the lateral high-resistance additive and the lateral portion of the molded material and calcined material. The sinter was heated for 1 hour at 550° C. Herein, the heating condition of the sinter is preferably 500 to 600° C. The reason is, if lower than 500° C., there is no effect of heat treatment and the high temperature electric charge life characteristic is impaired, or if exceeding 600° C., the voltage nonlinearity is extremely lowered and the high temperature electric charge life characteristic is also impaired. When heating the sinter, preferably, by printing crystalline glass paste of high resistance mainly composed of PbO to the lateral face of the sinter, if there is a defect in the lateral high-resistance layer, it is compensated for, and thickness fluctuation is eliminated, and the high temperature electric charge life, high current short duration characteristic and other reliability are improved. Later, polishing the both ends of the sinter, an aluminum sprayed electrode was formed, and a zinc oxide varistor was obtained. FIG. 1 shows a sectional view of a zinc oxide varistor according to an embodiment of the invention. In FIG. 1, reference numeral 1 is a sinter mainly composed of zinc oxide, 2 is a lateral high-resistance layer formed on a lateral face of the sinter 1, and 3 is an electrode formed at both ends of the sinter 1.

As comparative examples, a molded material obtained in the same process as in the invention, and an element pre-shrunk by calcining the molded material for 5 hours at 900° C. were prepared. The element was coated with a lateral high-resistance additive composed of $ZnFe_2O_4$ and $Zn_7Sb_2O_{12}$. Herein, $ZnFe_2O_4$ and $Zn_7Sb_2O_{12}$ were preliminarily synthesized at 1100° C. according to the publication cited above. To prepare the lateral high-resistance additive, $ZnFe_2O_4$ and $Zn_7Sb_2O_{12}$ were weighed so that the ratio of Fe and Sb might be 2:1, and purified water was added to this powder at 1:1, and to increase the strength of the coat film, PVA was added by 0.1 wt. % as binder, and the obtained lateral high-resistance additive was applied. The coating amount of the lateral high-resistance additive was 15 $mg/cm^2$ same as in the invention. By baking, forming electrode and heating-in the same process condition as in the invention, zinc oxide varistors of comparative examples were obtained.

Table 1 shows the composition of lateral high-resistance additive, visual state of appearance, voltage ratio characteristic ($V_{1\,mA}/V_{10\,\mu A}$), limiting voltage ratio characteristic, discharge current withstand capacity characteristic, and high temperature electric charge life characteristic of examples of the invention and examples of the prior art.

Herein, $V_{1\,mA}$ and $V_{10\,\mu A}$ were measured by using a constant DC current power source. The limiting voltage ratio characteristic was measured in the impulse current condition of 2.5 kA of standard waveform of 8/20 µs. To evaluate the discharge current withstand capacity characteristic, impulse of 50 KA of standard waveform of 4/10 µs was applied twice at an interval of 5 minutes, and abnormality in appearance was observed visually or by using a microscope as required. Later, the current was increased at 10 KA steps, and the breakdown limit was checked. To determine the high temperature electric charge life characteristic, at ambient temperature of 130° C. and charge rate of 95% AVR, the time until the resistance portion leakage current reached a double figure of the initial value was measured.

As clear from Table 1, according to the embodiment, the zinc oxide varistor can be extremely enhanced in the high current short duration characteristic by using $SiO_2$ mainly in the composition of the lateral high-resistance additive, and adding $Fe_2O_3$ by 1 to 40 molar % of the total amount. Further, by controlling the concentration range of $Fe_2O_3$ to 3 to 30 molar %, a further stable and excellent high current short duration characteristic can be obtained.

TABLE 1

| Sample No. | Composition of lateral high-resistance additive (molar %) $Fe_2O_3$ | $Bi_2O_2$ | $SiO_2$ | Appearance | Electric characteristic $V_{1\,mA}/V_{10\,\mu A}$ | Limiting voltage ratio | High current short duration characteristic 50KA | 60KA | 70KA | 80KA | High temperature electric charge life characteristic (Hr) |
|---|---|---|---|---|---|---|---|---|---|---|---|
| *101 | 0.1 | 0 | 99.9 | Uneven reaction | 1.38 | 1.60 | ○ x | | | | 400 |
| 102 | 1 | 0 | 99 | Favorable | 1.25 | 1.63 | ○ ○ | ○ x | | | 750 |
| 103 | 3 | 0 | 97 | Favorable | 1.26 | 1.62 | ○ ○ | ○ ○ | x | | 700 |
| 104 | 10 | 0 | 90 | Favorable | 1.25 | 1.61 | ○ ○ | ○ ○ | ○ ○ | x | 700 |
| *105 | 30 | 0 | 70 | Favorable | 1.26 | 1.64 | ○ ○ | ○ ○ | ○ ○ | x | 850 |
| 106 | 40 | 0 | 60 | Favorable | 1.29 | 1.62 | ○ ○ | ○ ○ | ○ x | | 800 |
| *107 | 50 | 0 | 50 | Favorable | 1.32 | 1.58 | ○ x | | | | 600 |
| 108 | 3 | 1 | 96 | Favorable | 1.21 | 1.59 | ○ ○ | ○ ○ | ○ ○ | x | 900 |
| 109 | 40 | 1 | 59 | Favorable | 1.25 | 1.60 | ○ ○ | ○ ○ | x | | >1000 |
| 110 | 10 | 15 | 75 | Favorable | 1.20 | 1.62 | ○ ○ | ○ ○ | ○ x | | >1000 |
| 111 | 3 | 20 | 77 | Favorable | 1.21 | 1.61 | ○ ○ | ○ ○ | ○ x | | >1000 |
| 112 | 30 | 20 | 50 | Favorable | 1.25 | 1.62 | ○ ○ | ○ ○ | x | | >1000 |

TABLE 1-continued

| Sample No. | Composition of lateral high-resistance additive (molar %) Fe$_2$O$_3$ | Bi$_2$O$_2$ | SiO$_2$ | Appearance | Electric characteristic V$_{1\ mA}$/V$_{10\ \mu A}$ | Limiting voltage ratio | High current short duration characteristic 50KA | 60KA | 70KA | 80KA | High temperature electric charge life characteristic (Hr) |
|---|---|---|---|---|---|---|---|---|---|---|---|
| *113 | 30 | 30 | 40 | Favorable | 1.24 | 1.64 | ○ x | | | | >1000 |
| *114 | $ZnFe_2O_4$:90 $Zn_7Sb_2O_{12}$:10 | (Molded material application) | | Uneven reaction | 1.36 | 1.65 | ○ x | | | | 600 |
| *115 | $ZnFe_2O_4$:50 $Zn_7Sb_2O_{12}$:50 | (Molded material application) | | Uneven reaction | 1.33 | 1.64 | ○ x | | | | 700 |
| 116 | Application of composition No. 104 on calcined material | | | Favorable | 1.23 | 1.60 | ○ ○ | ○ ○ | ○ ○ | x | 850 |
| 117 | Application of composition No. 110 on calcined material | | | Favorable | 1.19 | 1.62 | ○ ○ | ○ ○ | ○ x | | 800 |
| *118 | Application of composition No. 114 on calcined material | | | Favorable | 1.32 | 1.64 | ○ ○ | x | | | 650 |

*Comparative example, different from the invention.
○ No abnormality
x Broken

This is because Fe reacts with Zn and Sb at low temperature to form stable substances. Moreover, by adding $Bi_2O_3$ in a range of 20 molar % or less, the high temperature electric charge life characteristic can be enhanced. This is because Bi prevents scattering from inside to outside of the sinter. Although 1 molar % or more of $Bi_2O_3$ improves the electric charge life characteristic of the lateral high resistance additive and enhances the reactivity, if exceeding 20 molar %, the high current short duration characteristic is lowered. In the prior art, since $ZnFe_2O_4$ and $Zn_7Sb_2O_{12}$ are used as the lateral high-resistance additive, the reactivity with the sinter is poor, and the lateral high-resistance additive cannot be applied to the molded material, whereas, in the embodiment, using $Fe_2O_3$ and $Bi_2O_3$, in addition to the principal ingredient of $SiO_2$, the reaction activity is high, and the lateral high-resistance additive can be applied to the molded material, and the conventionally required calcining process can be omitted.

Figure 2:
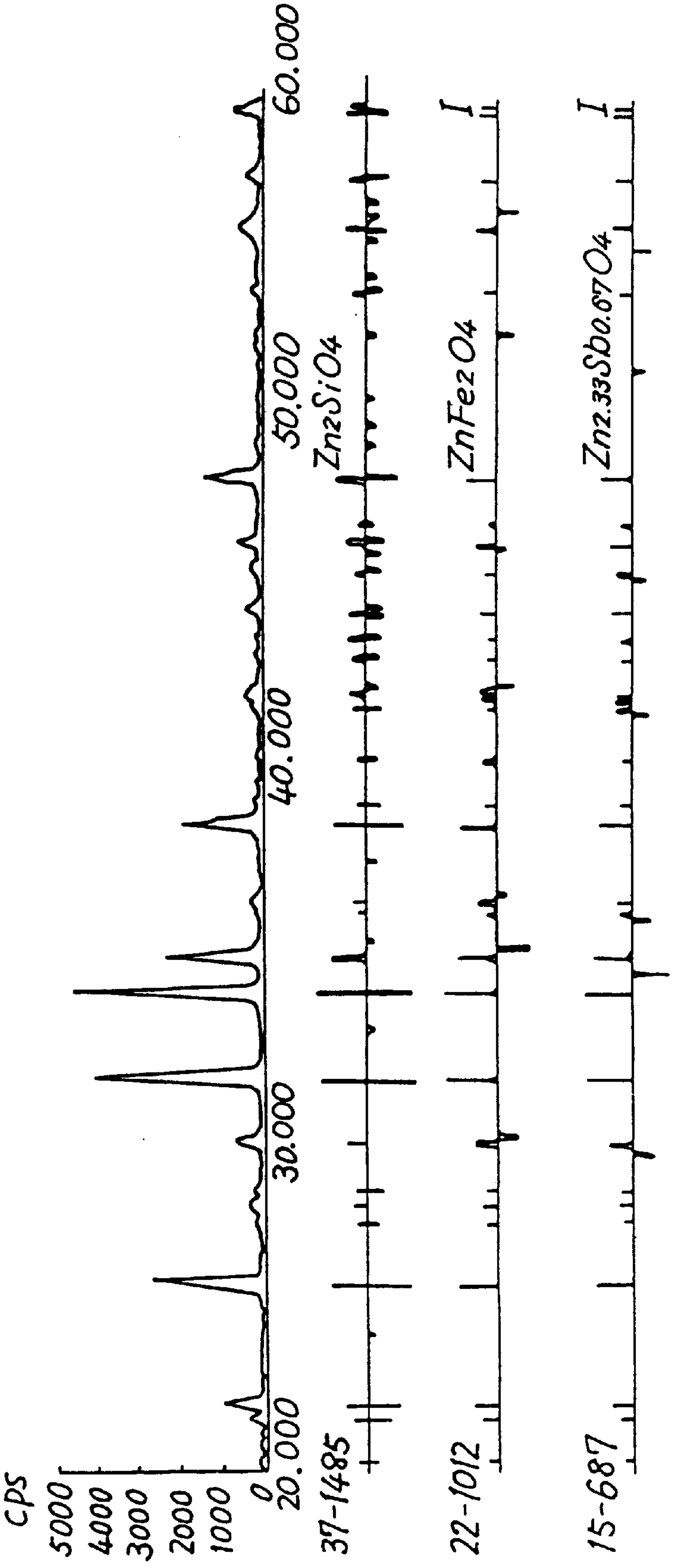
FIG. 2 is an X-ray diffraction data diagram of zinc oxide varistor in an embodiment of the invention.

In thus obtained zinc oxide varistor, the crystal structure of the lateral high-resistance layer was analyzed by X-ray diffraction. As a representative example, the X-ray diffraction result of the lateral high-resistance layer of the element of sample number 10 is shown in FIG. 2. The principal ingredient of the lateral high-resistance layer is $Zn_2SiO_4$, and the auxiliary ingredient is not a mixed crystal of $Zn_7Sb_2O_{12}$ and $ZnFe_2O_4$, but is an intermediate state, that is, a single crystal layer in a solid solution state of Fe in $Zn_7Sb_2O_{12}$. As a result of analysis by X-ray micro-analyzer, Sb and Fe were found to be present on a same point. Moreover, the structure of the lateral high-resistance layer was confirmed to be close to a two-layer structure, with $Zn_2SiO_4$ existing in the surface, and $Zn_7Sb_2O_{12}$ dissolving Fe existing at the sinter side. It seems because the structure is stable, the adhesion of $Zn_7Sb_2O_{12}$ dissolving Fe and sinter is strong and the dielectric strength of $ZnFe_2O_4$ is high, to explain why zinc oxide varistor of the invention is excellent in the high current short duration characteristic. Herein, Zn and Sb detected from the lateral high-resistance layer are derived from ZnO and $Sb_2O_3$ in the composition of the molded material, diffusing into the element surface by sintering reaction.

Moreover, in the composition region of the lateral high-resistance layer excellent in high current short duration characteristic, the amount of Fe contained in $Zn_7Sb_2O_{12}$ is 10 to 50 molar % of the amount of Sb. Above all, in the composition regions particularly excellent in the short wave tail tolerance characteristic (sample numbers 4, 6, 8, 10), it is 20 to 40 molar %. The amount of $Zn_2SiO_4$ in the lateral high-resistance layer was found to be 98 to 70 molar % by X-ray micro-analyzer and image analysis.

Samples 116 top 118 in Table 1 show data of using the lateral high-resistance additive of the invention in the calcined material. As far as $SiO_2$, $Bi_2O_3$ and $Fe_2O_3$ are within the scope of the claims of the invention, it is known that zinc oxide varistors excellent in high current short duration characteristic and high temperature electric charge life characteristic can be obtained same as when applied on the molded material. Therefore, since the lateral high-resistance additive of the invention is excellent in reactivity with the element, both molded material and calcined material can be used. Herein, when calcining, from the viewpoint of working efficiency when applying the lateral high-resistance additive, the shrinkage rate of the calcined material is preferred to be 10% or less, more preferably 5% or less. The reason is, if the shrinkage rate of the molded material is 10% or less, multiple oven pores are present in the calcined material, and when the lateral high-resistance additive is applied, moisture is promptly absorbed in the calcined material. When the shrinkage rate of the calcined material is 5% or less, the moisture is absorbed more efficiently, and the working efficiency is enhanced. On the other hand, when the shrinkage rate exceeds 10%, the sintering reaction is encouraged, the oven pores decrease, and moisture in the lateral high-resistance additive is less absorbed in the calcined material, and the working efficiency is impaired.

(Embodiment 2)

A second embodiment of the invention is described below. Granulated powder of zinc oxide varistor prepared in the same process as in embodiment 1 was molded into a size of 40 mm in diameter and 40 mm in thickness by a hydraulic press. As lateral high-resistance additive, $SiO_2$, $Bi_2O_3$, $Fe_2O_3$, and $Mn_3O_4$ were weighed as specified, and various lateral high-resistance additives were prepared, and applied on the molded material. At this time, the solid matter ratio of the organic binder and metal oxide was same as in embodiment 1. The application method was spray coating, and the coating amount was 15 mg/cm$^2$. The conditions after the baking process of the molded material were same as in embodiment 1, and samples of zinc oxide varistors were prepared.

Table 2 shows the composition of lateral high-resistance additive, voltage ratio characteristic, limiting voltage ratio characteristic, discharge current withstand capacity characteristic, and high temperature electric charge life characteristic according to the second embodiment of the invention.

As clear from Table 2, in the zinc oxide varistor according to the embodiment, using $SiO_2$ as the principal ingredient of the lateral high-resistance additive, when $Fe_2O_3$ is added by 1 to 40 molar % of the whole amount, $Bi_2O_2$ by 20 molar % or less, and $Mn_3O_4$ by 0.1 to 10 molar %, a zinc oxide varistor excellent in voltage ratio characteristic and high temperature electric charge life characteristic as compared with embodiment 1 is obtained. In particular, when the addition of $Mn_3O_4$ is in a range of 0.5 to 5 molar %, the characteristics are particularly excellent including discharge current withstand capacity characteristic. The reason is, it seems, $Mn_3O_4$ is dissolved, together with Fe, in $Zn_7Sb_2O_{12}$ in the lateral high-resistance layer to enhance the stability of $Zn_7Sb_2O_{12}$.

(Embodiment 3)

A third embodiment of the invention is described below. Granulated powder of zinc oxide varistor prepared in the same process as in embodiment 1 was molded into a size of 40 mm in diameter and 40 mm in thickness by a hydraulic press. As lateral high-resistance additive, $SiO_2$, $Bi_2O_3$, $Fe_2O_3$, and $Al_2O_3$ were weighed as specified, and various lateral high-resistance additives were prepared. At this time, the solid matter ratio of the organic binder and metal oxide was same as in embodiment 1. The application method was spray coating, and the coating amount was 15 $mg/cm^2$. The conditions after the baking process of the molded material were same as in embodiment 1, and samples of zinc oxide varistors were prepared.

Table 3 shows the composition of lateral high-resistance additive, voltage ratio characteristic, limiting voltage ratio characteristic, discharge current withstand capacity characteristic, and high temperature electric charge life characteristic according to the third embodiment of the invention.

As clear from Table 3, in the zinc oxide varistor according to the embodiment, using $SiO_2$ as the principal ingredient of the lateral high-resistance additive, when $Fe_2O_3$ is added by 1 to 40 molar % of the whole amount, $Bi_2O_2$ by 20 molar % or less, and $Al_2O_3$ by 0.01 to 5 molar %, a zinc oxide varistor excellent in limiting voltage ratio characteristic and discharge tolerance characteristic as compared with embodiment 1 is obtained. In particular, when the addition of $Al_2O_3$ is in a range of 0.1 to 2.5 molar %, the characteristics are particularly excellent including the high temperature electric charge life characteristic. The reason is, it

TABLE 2

| Sample No. | Composition of lateral high-resistance additive (molar %) $Fe_2O_3$ | $Bi_2O_3$ | $SiO_2$ | $Mn_2O_4$ | Appearance | Electric characteristic $V_{1\,mA}/V_{10\,\mu A}$ | Limiting voltage ratio | High current short duration characteristic 50KA | 60KA | 70KA | 80KA | High temperature electric charge life characteristic (Hr) |
|---|---|---|---|---|---|---|---|---|---|---|---|---|
| *201 | 0.1 | 0 | 98.9 | 1 | Uneven reaction | 1.28 | 1.60 | x | | | | 500 |
| 202 | 1 | 0 | 98 | 1 | Favorable | 1.22 | 1.63 | ○ ○ | ○ x | | | 950 |
| 203 | 3 | 0 | 96 | 1 | Favorable | 1.25 | 1.62 | ○ ○ | ○ ○ | x | | 800 |
| 204 | 10 | 0 | 90 | 0 | Favorable | 1.25 | 1.61 | ○ ○ | ○ ○ | ○ ○ | x | 700 |
| 205 | 10 | 0 | 89.95 | 0.05 | Favorable | 1.26 | 1.64 | ○ ○ | ○ ○ | ○ ○ | x | 750 |
| 206 | 10 | 0 | 89.9 | 0.1 | Favorable | 1.24 | 1.64 | ○ ○ | ○ ○ | ○ x | | 800 |
| 207 | 10 | 0 | 89.5 | 0.5 | Favorable | 1.20 | 1.59 | 0 ○ | ○ ○ | ○ ○ | x | >1000 |
| 208 | 10 | 0 | 85 | 5 | Favorable | 1.15 | 1.58 | ○ ○ | ○ ○ | ○ ○ | ○ x | >1000 |
| 209 | 10 | 0 | 80 | 10 | Favorable | 1.16 | 1.60 | ○ ○ | ○ ○ | x | | >1000 |
| *210 | 10 | 0 | 75 | 15 | Favorable | 1.16 | 1.62 | ○ x | | | | >1000 |
| 211 | 20 | 1 | 78 | 1 | Favorable | 1.26 | 1.64 | ○ ○ | ○ ○ | x | | 500 |
| 212 | 20 | 5 | 74 | 1 | Favorable | 1.23 | 1.61 | ○ ○ | ○ ○ | ○ x | | >1000 |
| 213 | 20 | 10 | 65 | 5 | Favorable | 1.19 | 1.63 | ○ ○ | ○ ○ | ○ x | | >1000 |
| *214 | 20 | 10 | 55 | 15 | Favorable | 1.21 | 1.64 | ○ x | | | | 750 |
| *215 | 30 | 30 | 35 | 5 | Favorable | 1.24 | 1.63 | ○ x | | | | 450 |

*Comparative example, different from the invention.
○ No abnormality
x Broken

TABLE 3

| Sample No. | Composition of lateral high-resistance additive (molar %) $Fe_2O_3$ | $Bi_2O_3$ | $SiO_2$ | $Al_2O_3$ | Appearance | Electric characteristic $V_{1\,mA}/V_{10\,\mu A}$ | Limiting voltage ratio | High current short duration characteristic 50KA | 60KA | 70KA | 80KA | High temperature electric charge life characteristic (Hr) |
|---|---|---|---|---|---|---|---|---|---|---|---|---|
| *301 | 0.1 | 0 | 98.9 | 1 | Uneven reaction | 1.30 | 1.61 | x | | | | 400 |
| 302 | 1 | 0 | 98 | 1 | Favorable | 1.28 | 1.55 | ○ ○ | ○ x | | | 550 |
| 303 | 3 | 0 | 96 | 1 | Favorable | 1.29 | 1.56 | ○ ○ | ○ ○ | x | | 500 |
| 304 | 10 | 0 | 90 | 0 | Favorable | 1.25 | 1.61 | ○ ○ | ○ ○ | ○ ○ | x | 700 |
| 305 | 10 | 0 | 89.99 | 0.01 | Favorable | 1.27 | 1.58 | ○ ○ | ○ ○ | ○ ○ | x | 600 |

TABLE 3-continued

| Sample No. | Composition of lateral high-resistance additive (molar %) Fe$_2$O$_3$ | Bi$_2$O$_3$ | SiO$_2$ | Al$_2$O$_3$ | Appearance | Electric characteristic $V_{1\,mA}/V_{10\,\mu A}$ | Limiting voltage ratio | High current short duration characteristic 50KA | 60KA | 70KA | 80KA | High temperature electric charge life characteristic (Hr) |
|---|---|---|---|---|---|---|---|---|---|---|---|---|
| 306 | 10 | 0 | 89.9 | 0.1 | Favorable | 1.25 | 1.55 | ○ ○ | ○ ○ | ○ ○ | x | 750 |
| 307 | 10 | 0 | 89.5 | 0.5 | Favorable | 1.26 | 1.53 | ○ ○ | ○ ○ | ○ ○ | ○ x | 850 |
| 308 | 10 | 0 | 87.5 | 2.5 | Favorable | 1.25 | 1.54 | ○ ○ | ○ ○ | ○ ○ | ○ x | 800 |
| 309 | 10 | 0 | 85 | 5 | Favorable | 1.31 | 1.56 | ○ ○ | ○ ○ | x | | 450 |
| *310 | 10 | 0 | 82.5 | 7.5 | Uneven reaction | 1.42 | 1.58 | ○ x | | | | 50 |
| 311 | 20 | 1 | 78 | 1 | Favorable | 1.26 | 1.57 | ○ ○ | ○ ○ | x | | 500 |
| 312 | 20 | 5 | 74 | 1 | Favorable | 1.23 | 1.56 | ○ ○ | ○ ○ | ○ x | | >1000 |
| 313 | 20 | 10 | 67.5 | 2.5 | Favorable | 1.29 | 1.55 | ○ ○ | ○ ○ | ○ x | | 550 |
| *314 | 20 | 10 | 60 | 10 | Uneven reaction | 1.45 | 1.60 | x | | | | 50 |
| *315 | 30 | 30 | 35 | 5 | Favorable | 1.38 | 1.59 | ○ x | | | | 250 |

*Comparative example, different from the invention.
○ No abnormality
x Broken seems, $Al_2O_3$ is diffused in the lateral face of the sinter through the lateral high-resistance layer to be dissolved in ZnO to lower the specific resistance, thereby enhancing the limiting voltage ratio characteristic and the discharge tolerance characteristic.

(Embodiment 4)

A fourth embodiment of the invention is described below. Granulated powder of zinc oxide varistor prepared in the same process as in embodiment 1 was molded into a size of 40 mm in diameter and 40 mm in thickness by a hydraulic press. As lateral high-resistance additive, $SiO_2$, $Bi_2O_3$, $Fe_2O_3$, and $B_2O_3$ were weighed as specified, and various lateral high-resistance additives were prepared. At this time, were same as in embodiment 1, and samples of zinc oxide varistors were prepared.

Table 4 shows the composition of lateral high-resistance additive, voltage ratio characteristic, limiting voltage ratio characteristic, discharge current withstand capacity characteristic, and high temperature electric charge life characteristic according to the fourth embodiment of the invention.

As clear from Table 4, in the zinc oxide varistor according to the embodiment, using $SiO_2$ as the principal ingredient of the

TABLE 4

| Sample No. | Composition of lateral high-resistance additive (molar %) Fe$_2$O$_3$ | Bi$_2$O$_3$ | SiO$_2$ | B$_2$O$_3$ | Appearance | Electric characteristic $V_{1\,mA}/V_{10\,\mu A}$ | Limiting voltage ratio | High current short duration characteristic 50KA | 60KA | 70KA | 80KA | High temperature electric charge life characteristic (Hr) |
|---|---|---|---|---|---|---|---|---|---|---|---|---|
| *401 | 0.1 | 0 | 98.9 | 1 | Uneven reaction | 1.28 | 1.63 | x | | | | 550 |
| 402 | 1 | 0 | 98 | 1 | Favorable | 1.23 | 1.64 | ○ ○ | ○ x | | | >1000 |
| 403 | 3 | 0 | 96 | 1 | Favorable | 1.24 | 1.62 | ○ ○ | ○ ○ | x | | 850 |
| 404 | 10 | 0 | 90 | 0 | Favorable | 1.25 | 1.60 | ○ ○ | ○ ○ | ○ ○ | x | 650 |
| 405 | 10 | 0 | 89.99 | 0.01 | Favorable | 1.25 | 1.64 | ○ ○ | ○ ○ | ○ ○ | x | 800 |
| 406 | 10 | 0 | 89.95 | 0.05 | Favorable | 1.24 | 1.62 | ○ ○ | ○ ○ | ○ ○ | x | >1000 |
| 407 | 10 | 0 | 89.5 | 0.5 | Favorable | 1.22 | 1.62 | ○ ○ | ○ ○ | ○ ○ | ○ x | >1000 |
| 408 | 10 | 0 | 87.5 | 2.5 | Favorable | 1.20 | 1.60 | ○ ○ | ○ ○ | ○ ○ | ○ x | >1000 |
| 409 | 10 | 0 | 85 | 5 | Favorable | 1.18 | 1.64 | ○ ○ | ○ x | | | >1000 |
| *410 | 10 | 0 | 82.5 | 7.5 | Uneven reaction | 1.23 | 1.63 | x | | | | >1000 |
| 411 | 20 | 1 | 78 | 1 | Favorable | 1.24 | 1.62 | ○ ○ | ○ ○ | x | | 850 |
| 412 | 20 | 5 | 74 | 1 | Favorable | 1.24 | 1.61 | ○ ○ | ○ ○ | x | | >1000 |
| 413 | 20 | 10 | 65 | 5 | Favorable | 1.20 | 1.66 | ○ ○ | ○ ○ | x | | >1000 |
| *414 | 20 | 10 | 62.5 | 7.5 | Uneven reaction | 1.26 | 1.70 | x | | | | 550 |
| *415 | 30 | 30 | 39 | 1 | Favorable | 1.24 | 1.64 | ○ x | | | | 650 |

*Comparative example, different from the invention.
○ No abnormality
x Broken the organic binder was 5 wt. % aqueous acrylic (hereinafter called MMAC). The solid matter ratio of the metal oxide was same as in embodiment 1. The application method was spray coating, and the coating amount was 15 mg/cm$^2$. The conditions after the baking process of the molded material lateral high-resistance additive, when $Fe_2O_3$ is added by 1 to 40 molar % of the whole amount, $Bi_2O_2$ by 20 molar % or less, and $B_2O_3$ by 0.1 to 5 molar %, a zinc oxide varistor excellent in voltage ratio characteristic and high temperature electric discharge life characteristic as compared with embodiment 1 is obtained. In particular, when the addition of $B_2O_3$ is in a range of 0.5 to 2.5 molar %, the characteristics are particularly excellent including the discharge current withstand capacity characteristic. The reason of enhancement of high temperature electric charge life characteristic by addition of $B_2O_3$ is, it seems, $B_2O_3$ is diffused in the lateral face of the sinter through the lateral high-resistance layer to increase the stability of the grain boundary area.

Incidentally, when $B_2O_3$ is added in a form of glass such as bismuth borosilicate and lead borosilicate, it is confirmed that the high temperature electric charge life characteristic is enhanced. The reason of adding in glass form is, when using PVA as binder, because $B_2O_3$ and binder solution react to increase extremely the viscosity of the lateral high resistance additive, and it is intended to prevent this phenomenon.

(Embodiment 5)

A fifth embodiment of the invention is described below. Granulated powder of zinc oxide varistor prepared in the same process as in embodiment 1 was molded into a size of 40 mm in diameter and 40 mm in thickness by a hydraulic press. The composition of the lateral high-resistance additive is the lateral high-resistance additive used in sample number 4 in embodiment 1, that is, a composition of 90 molar % of $SiO_2$ and 10 molar % of $Fe_2O_3$, and a lateral high-resistance additive in a slurry form was prepared. The lateral high-resistance additive was prepared at a solid matter ratio of 25% by using 5 wt. % methyl cellulose (hereinafter called MC) as the binder, and it was applied on the lateral face of the molded material by a curvature screen printing method. Consequently, the molded material coated with the lateral high-resistance additive was put in a baking container, and baked for 5 hours at 900 to 1300° C. to sinter the element, while the lateral high-resistance additive and the lateral face of the molded material were reacted to obtain a sinter. Then, by the same process as in embodiment 1, the zinc oxide varistor was obtained.

To obtain comparative examples, on the molded material obtained in the same process as in embodiment 1, and the element obtained by pre-shrinking by calcining for 5 hours at 900° C., the lateral high-resistance additive composed of $ZnFe_2O_4$ and $Zn_7Sb_2O_{12}$ was applied, and baked, and samples were prepared.

Table 5 shows the evaluation results of appearance of the sinter, $V_{1\ mA/mm}$ (varistor voltage per unit thickness), high current short duration characteristic, and low current long duration characteristic of the zinc oxide varistor obtained in this manner.

Herein, to evaluate the low current long duration characteristic, a rectangular wave current of 2 ms was applied 20 times at intervals of 2 minutes and the appearance was investigated. The current was started from 50 A, and increased at 50 A steps until the element was broken.

TABLE 5

| Sample No. | Lateral high-resistance additive | Calcining of molded material | Baking temperature (° C.) | Appearance of sinter | $V_{1\ mA/mm}$ | High current short duration characteristic 40KA | | 50KA | | 60KA | | 70KA | | Low current long duration characteristic 50A | 100A | 150A | 200A |
|---|---|---|---|---|---|---|---|---|---|---|---|---|---|---|---|---|---|
| *501 | No. 104 | No | 900 | Partly unreacted | 800 | o | x | | | | | | | o | x | | |
| 502 | No. 104 | No | 950 | Favorable | 500 | o | o | x | | | | | | o | o | x | |
| 503 | No. 104 | No | 1000 | Favorable | 350 | o | o | o | o | x | | | | o | o | o | x |
| 504 | No. 104 | No | 1200 | Favorable | 200 | o | o | o | o | o | o | o | o | o | o | o | o |
| 505 | No. 104 | No | 1300 | Favorable | 170 | o | o | o | o | o | o | o | x | o | o | o | o |
| *506 | No. 104 | No | 1350 | Partly scattered | 160 | o | o | o | x | | | | | o | o | o | o |
| 507 | No. 104 | Yes | 950 | Favorable | 450 | o | o | x | | | | | | o | o | x | |
| 508 | No. 104 | Yes | 1200 | Favorable | 190 | o | o | o | o | o | o | o | x | o | o | o | o |
| 509 | No. 104 | Yes | 1300 | Favorable | 165 | o | o | o | o | o | o | x | | o | o | o | o |
| *510 | No. 115 | No | 900 | Partly unreacted | 800 | x | | | | | | | | o | x | | |
| *511 | No. 115 | No | 950 | Favorable | 500 | o | x | | | | | | | o | x | | |
| *512 | No. 115 | No | 1200 | Favorable | 200 | o | o | o | o | x | | | | o | o | o | x |
| *513 | No. 115 | Yes | 950 | Favorable | 450 | o | x | | | | | | | o | x | | |
| *514 | No. 115 | Yes | 1200 | Favorable | 190 | o | o | o | o | x | | | | o | o | o | x |

*Comparative example, different from the invention.
o No abnormality
x Broken

As known from Table 5, when using the lateral high-resistance additive of $SiO_2$ and $Fe_2O_3$, as compared with the comparative examples, it is recognized that the high current short duration characteristic and low current long duration characteristic are excellent on the whole. Herein, if the baking temperature is 900° C., the reactivity of the lateral high-resistance additive and element is poor, and the high current short duration characteristic is low. At 1350° C., on the other hand, part of the lateral high-resistance additive scatters away, and the high current short duration characteristic is poor, too. When baked at low temperature, zinc oxide particles are not grown sufficiently, and $V_{1\ mA/mm}$ is too high, and it is not practical as an element for electric power. Therefore, the baking temperature is preferably 950 to 1300° C. More preferably, it should be 1000 to 1200° C. in consideration of the low current long duration characteristic.

(Embodiment 6)

A sixth embodiment of the invention is described below. Granulated powder of zinc oxide varistor prepared in the same process as in embodiment 1 was molded into a size of 40 mm in diameter and 40 mm in thickness by a hydraulic press. At this time, the molding pressure was adjusted so that the density of the molded material might be 3.0 to 3.5 g/cm$^3$. As the lateral high-resistance additive, the lateral high-resistance additive used in sample number 4 in embodiment 1 was used, that is, a composition of 90 molar % of $SiO_2$ and 10 molar % of $Fe_2O_3$.

The lateral high-resistance additive was applied on the lateral face of the prepared molded material by transfer coating method. In transfer coating, the lateral high-resistance additive was preliminarily spread wide thinly on a metal plate by printing, and the molded material was applied by rotating. In this method, the lateral high-resistance additive can be applied easily in a very simple equipment. However, as compared with the spray coating, the coating thickness of the lateral high-resistance additive is slightly uneven, and hence the short wave tail tolerance characteristic fluctuates, but the uniformity can be improved by adjusting the rotating speed of the molded material. Moreover, to improve the mass producibility, the lateral high-resistance additive may be applied on the surface of the rotating roller, and the lateral high-resistance additive may be applied while rotating the molding material. Then, in the same process condition as in embodiment 1, from baking to electrode application, the zinc oxide varistor was obtained. As a comparative example, the lateral high-resistance additive was applied on the calcined material calcined at 950° C., and a sample was prepared by baking.

Table 6 shows the voltage ratio characteristic, limiting voltage characteristic, and low current long duration characteristic of the zinc oxide varistors obtained in the above process.

Herein, the voltage ratio characteristic and limiting voltage characteristic were measured in the same conditions as in embodiment 1. Besides, to evaluate the low current long duration characteristic, a rectangular wave current of 2 mS was applied 20 times at intervals of 2 minutes and the appearance was investigated. The current was started from 150 A, and increased at 50 A steps until the element was broken.

TABLE 6

| Sample No. | Density of molded material (g/cm$^3$) | Calcining of molded material | Electric characteristic $V_{1\,mA}/V_{10\,\mu A}$ | Electric characteristic Limiting voltage ratio | Low current long duration characteristic 150A | 200A | 250A | 300A |
|---|---|---|---|---|---|---|---|---|
| *601 | 3.1 | No | 1.20 | 1.62 | x | | | |
| 602 | 3.15 | No | 1.21 | 1.61 | ○ | ○ | ○ | x |
| 603 | 3.2 | No | 1.21 | 1.62 | ○ | ○ | ○ | x |
| 604 | 3.35 | No | 1.23 | 1.63 | ○ | ○ | ○ | ○ |
| 605 | 3.4 | No | 1.24 | 1.63 | ○ | ○ | ○ | x |
| *606 | 3.5 | No | 1.27 | 1.65 | x | | | |
| *607 | 2.9 | Yes | 1.20 | 1.60 | ○ | x | | |
| 608 | 3.0 | Yes | 1.20 | 1.61 | ○ | ○ | ○ | x |
| 609 | 3.4 | Yes | 1.22 | 1.60 | ○ | ○ | ○ | x |
| *610 | 3.5 | Yes | 1.23 | 1.61 | ○ | x | | |

*Comparative example, different from the invention.
○ No abnormality
x Broken

As known from Table 6, when applying the lateral high-resistance additive on the molded material, the low current long duration characteristic is excellent when the density is 3.15 to 3.4 g/cm$^3$. That is, if smaller than 3.15 g/cm$^3$, in the manufacturing method of the invention, since the lateral high-resistance additive made from an aqueous binder is applied on the molded material, moisture permeates inside from the lateral face of the molded material, and the binder in the molded material is swollen, and micro-cracks are formed on the surface of the molded material. On the other hand, if greater than 3.4 g/cm$^3$, the binder in the molded material is not burned sufficiently, and cracks and other defects are formed inside the sinter. These problems are lessened by calcining the molded material, and the favorable density range of the molded material for low current long duration characteristic is found to be 3.15 to 3.4 g/cm$^3$. This is because, when the molded material is calcined, the strength of the molded material is improved and micro-cracks are not formed on the surface if the lateral high-resistance additive is applied. If the molded material is calcined, however, when the molded material density is over 3.4 g/cm$^3$, the binder is not burned sufficiently, internal defects occur, and the low current long duration characteristic is impaired.

(Embodiment 7)

A seventh embodiment of the invention is described below. Granulated powder of zinc oxide varistor prepared in the same process as in embodiment 1 was molded into a size of 40 mm in diameter and 40 mm in thickness by a hydraulic press. At this time, the molding pressure was adjusted so that the density of the molded material might be 3.3 g/cm$^3$ As the lateral high-resistance additive, the lateral high-resistance additive used in sample number 11 in embodiment 1 was used, that is, a composition of 77 molar % of $SiO_2$, 20 molar % of $Bi_2O_3$, and 3 molar % of $Fe_2O_3$. According to the blending composition, $SiO_2$, $Bi_2O_3$, and $Fe_2O_3$ were weighed as specified, and an oxide for lateral high-resistance additive was prepared. As an organic binder, water-soluble PVA, MC, hydroxypropyl cellulose (hereinafter HPC), and MMAC were weighed as specified, and dissolved in purified water. The oxide of the lateral high-resistance additive and the organic binder aqueous solution were weighed, and mixed sufficiently in a ball mill, and a slurry composition of lateral high-resistance additive was obtained. The viscosity of the slurry was adjusted by adding purified water. On the lateral face of the molded material, this lateral high-resistance additive was applied by dip method. In the dip method, the flat portion of the molded material is held by a jig, and is passed through the lateral high-resistance additive. The molded material coated with thus prepared lateral high-resistance additive was treated in the same process as in embodiment 1, and the zinc oxide varistor was obtained.

Table 7 shows the types of lateral high-resistance additive, time to dry to the touch, appearance of sinter, high current short duration characteristic, and low current long duration characteristic.

As known from Table 7, the binder to be used in the lateral high-resistance additive may be any one of PVA, MC, HPC, and MMAC, but the preferred concentration of binder aqueous solution is found to be 1 to 15 wt. %. That is, if the concentration of the binder aqueous solution is low, the coat film strength of the lateral high-resistance additive is low, a sufficient coating amount is not obtained, and the high current short duration characteristic is lowered. If too high, on the other hand, the slurry flow is poor, and it takes a long time to dry and micro-cracks are formed on the surface of the molded material, and hence the high current short duration characteristic and low current long duration characteristic are impaired. The amount of addition of metal oxide for lateral high-resistance additive is preferred to be 15 to 60 wt. % as the solid matter ratio. If the solid matter ratio is low, it takes time to dry and the low current long duration characteristic is impaired, or if the solid matter ratio is too high, the coat film cannot be applied uniformly and the high current short duration characteristic is impaired. Incidentally, the viscosity of the lateral high-resistance additive should be preferably changed depending on the method of application, lower in the spray coating method and higher in the screen printing method. Approximately, a practical viscosity range is 500 to 1000 cps.

TABLE 7

| Sample | | Binder addition | Solid matter ratio | Time to dry to the touch | Appearance | High current short duration characteristic | | | | Low current long duration characteristic | | | |
|---|---|---|---|---|---|---|---|---|---|---|---|---|---|
| No. | Binder | (%) | (%) | (sec) | of sinter | 50KA | 60KA | 70KA | 80KA | 150A | 200A | 250A | 300A |
| *701 | PVA | 0.1 | 30 | 30 | Favorable | ○ ○ | x | | | ○ | x | | |
| 702 | PVA | 1 | 30 | 25 | Favorable | ○ ○ | ○ ○ | x | | ○ | ○ | ○ | x |
| 703 | PVA | 2.5 | 10 | 30 | Favorable | ○ ○ | ○ ○ | ○ x | | ○ | ○ | x | |
| 704 | PVA | 2.5 | 15 | 25 | Favorable | ○ ○ | ○ ○ | ○ ○ | x ○ | ○ | ○ | x | |
| 705 | PVA | 2.5 | 50 | 15 | Favorable | ○ ○ | ○ ○ | ○ ○ | ○ x | ○ | ○ | ○ | x |
| 706 | PVA | 2.5 | 60 | 15 | Favorable | ○ ○ | ○ ○ | ○ ○ | x | ○ | ○ | ○ | x |
| 707 | PVA | 10 | 30 | 25 | Favorable | ○ ○ | ○ ○ | ○ ○ | x | ○ | ○ | ○ | x |
| 708 | PVA | 15 | 30 | 30 | Favorable | ○ ○ | ○ ○ | ○ ○ | x | ○ | ○ | x | |
| *709 | PVA | 30 | 65 | 35 | Uneven reaction | ○ ○ | x | | | ○ | ○ | x | |
| 710 | MC | 5 | 30 | 25 | Favorable | ○ ○ | ○ ○ | ○ ○ | x | ○ | ○ | ○ | x |
| 711 | MC | 10 | 20 | 30 | Favorable | ○ ○ | ○ ○ | ○ x | | ○ | ○ | ○ | x |
| 712 | HPC | 5 | 30 | 25 | Favorable | ○ ○ | ○ ○ | ○ ○ | x | ○ | ○ | x | |
| 713 | HPC | 10 | 20 | 30 | Favorable | ○ ○ | ○ ○ | ○ ○ | ○ x | ○ | ○ | ○ | x |
| 714 | MMAC | 5 | 30 | 20 | Favorable | ○ ○ | ○ ○ | ○ ○ | x | ○ | ○ | ○ | x |
| 715 | MMAC | 10 | 20 | 25 | Favorable | ○ ○ | ○ ○ | ○ ○ | x | ○ | ○ | ○ | x |

*Comparative example, different from the invention.
○ No abnormality
x Broken

INDUSTRIAL APPLICABILITY

According to the invention, as described herein, when the lateral high-resistance additive is applied and baked on the lateral face of a molded material or calcined material, and a high-resistance layer is formed on the lateral face of a zinc oxide varistor, iron, bismuth and silicon in the lateral high-resistance additive react very well with the ingredients in the molded material or calcined material, thereby forming a high-resistance layer comprising $Zn_2SiO_4$ as principal ingredient, and at least $Zn_7Sb_2O_{12}$ dissolving Fe as auxiliary ingredient. This high resistance-layer is homogeneous, excellent in adhesion with the sinter, and high in dielectric strength, so that discharge current withstand capacity characteristic and high current short duration characteristic may be substantially enhanced. Moreover, by adding oxides of Mn, Al, B and others to the lateral high-resistance additive, the high temperature electric charge life characteristic and other properties can be enhanced. In addition, since the lateral high-resistance additive is excellent in reactivity with the molded material, it can be directly applied on the molded material, and hence the loss in time and energy can besaved, and the productivity can be enhanced.

We claim:

1. A lateral high-resistance additive for zinc oxide varistor having a metal oxide comprising 1–40 molar % (in terms of $Fe_2O_3$) iron, 0–20 molar % (in terms of $Bi_2O_3$) bismuth, and the balance consisting of $SiO_2$.

2. A lateral high-resistance additive for zinc oxide varistor of claim 1, wherein the metal oxide further comprises 0.1 to 10 molar % (in terms of $Mn_3O_4$) manganese.

3. A lateral high-resistance additive for zinc oxide varistor of claim 1, wherein the metal oxide further comprises 0.01 to 2 molar % (in terms of $Al_2O_3$) aluminum.

4. A lateral high-resistance additive for zinc oxide varistor of claim 1, wherein the metal oxide further comprises 0.05 to 5 molar % (in terms of $B_2O_3$) boron.

5. A lateral high-resistance additive for zinc oxide varistor of claim 4, wherein boron is added in a form of glass frit.

6. A manufacturing method of zinc oxide varistor comprising the steps of compacting a powdery raw material of zinc oxide varistor containing zinc oxide as principal ingredient and at least antimony as auxiliary material to obtain a molded material, applying a lateral high-resistance additive composed of an aqueous binder solution and metal oxide on the lateral face of the molded material, baking the molded material to obtain a sinter, and heating the sinter in a temperature range of 500 to 600° C., wherein the metal oxide comprises 1–40 molar % (in terms of $Fe_2O_3$) iron, 0–20 molar % (in terms of $Bi_2O_3$) bismuth, and the balance consisting of $SiO_2$.

7. A manufacturing method of zinc oxide varistor of claim 6, wherein the baking temperature is in a temperature range of 950 to 1300° C.

8. A manufacturing method of zinc oxide varistor of claim 6, wherein the density of the molded material is in a range of 3.15 to 3.40 g/cm$^3$.

9. A manufacturing method of zinc oxide varistor of claim 6, wherein the lateral high-resistance additive is applied in any one of dip coating method, spray coating method, transfer coating method, and curvature screen printing method.

10. A manufacturing method of zinc oxide varistor of claim 6, wherein the metal oxide further includes at least one selected from the group consisting of manganese, aluminum, and boron.

11. A manufacturing method of zinc oxide varistor comprising the steps of compacting a powdery raw material for zinc oxide varistor to obtain a molded material, calcining the molded material until its shrinkage rate is 10% or less to obtained a calcined material, applying a lateral high-resistance additive composed of an aqueous binder solution and metal oxide on the lateral face of the calcined material, baking the calcined material to obtain a sinter, and heating the sinter in a temperature range of 500 to 600° C., wherein the metal oxide comprises 1–40 molar % (in terms of $Fe_2O_3$) iron, 0–20 molar % (in terms of $Bi_2O_3$) bismuth, and the balance consisting of $SiO_2$.

12. A manufacturing method of zinc oxide varistor of claim 11, wherein the baking temperature is in a temperature range of 950 to 1300° C.

13. A manufacturing method of zinc oxide varistor of claim 11, wherein the density of the molded material is in a range of 3.15 to 3.40 g/cm$^3$.

14. A manufacturing method of zinc oxide varistor of claim 11, wherein the lateral high-resistance additive is applied in any one of dip coating method, spray coating method, transfer coating method, and curvature screen printing method.

15. A manufacturing method of zinc oxide varistor of claim 11, wherein the metal oxide further includes at least one selected from the group consisting of manganese, aluminum, and boron.

* * * * *